(12) United States Patent
Kurono

(10) Patent No.: US 9,075,130 B2
(45) Date of Patent: Jul. 7, 2015

(54) CALCULATION DEVICE FOR RADAR APPARATUS, RADAR APPARATUS, AND CALCULATION METHOD AND PROGRAM FOR RADAR APPARATUS

(75) Inventor: Yasuhiro Kurono, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 441 days.

(21) Appl. No.: 13/427,350

(22) Filed: Mar. 22, 2012

(65) Prior Publication Data

US 2012/0249359 A1    Oct. 4, 2012

(30) Foreign Application Priority Data

Apr. 4, 2011    (JP) ................................ 2011-082628

(51) Int. Cl.
*G01S 13/48* (2006.01)
*G01S 7/35* (2006.01)
(Continued)

(52) U.S. Cl.
CPC .............. *G01S 3/465* (2013.01); *G01S 7/352* (2013.01); *G01S 3/74* (2013.01); *G01S 13/345* (2013.01)

(58) Field of Classification Search
CPC ............ G01S 3/02; G01S 3/04; G01S 3/043; G01S 3/12; G01S 3/74; G01S 5/02; G01S 5/0205; G01S 5/0221; G01S 5/04; G01S 13/06; G01S 13/42; G01S 13/46; G01S 13/48; G01S 13/66; G01S 13/72; G01S 3/46; G01S 3/465; G01S 13/02; G01S 13/08; G01S 13/32; G01S 13/34; G01S 13/345; G01S 7/02; G01S 7/35; G01S 7/352; G01S 7/354; G01S 2007/356; G01S 13/342; G01S 13/343

USPC ......... 342/118, 146–158, 175, 192–197, 350, 342/351, 367–377, 385, 417–449, 89, 342/128–133; 84/1, 600, 601, 602, 622
See application file for complete search history.

(56) References Cited

U.S. PATENT DOCUMENTS 5,525,997 A * 6/1996 Kwon ............................ 342/157
7,084,812 B2 * 8/2006 Xin ............................... 342/417
(Continued)

FOREIGN PATENT DOCUMENTS

| JP | A-2003-14843 | 1/2003 |
|---|---|---|
| JP | A-2005-49123 | 2/2005 |
| JP | A-2009-74990 | 4/2009 |

OTHER PUBLICATIONS

Jul. 20, 2012 Extended European Search Report issued in European Patent Application No. 12162523.0.
(Continued)

*Primary Examiner* — Bernarr Gregory
(74) *Attorney, Agent, or Firm* — Oliff PLC

(57) ABSTRACT

There is provided a calculation device for a radar apparatus which is configured to specify a direction of a target based on respective reception signals of a plurality of antennae. A calculation unit is configured to use a predetermined estimation algorithm of estimating angles of targets corresponding to a preset separable-number from the respective reception signals, set an arbitrary separable-number to generate a mode vector from the estimated angles of the targets, obtained by the predetermined estimation algorithm, and determine whether the set separable-number is proper or not based on a magnitude of an orthogonal component calculated from the mode vector and an input vector of the respective reception signals.

7 Claims, 18 Drawing Sheets

(51) Int. Cl.
*G01S 3/46* (2006.01)
*G01S 3/74* (2006.01)
*G01S 13/34* (2006.01)
*G01S 7/00* (2006.01)
*G01S 13/00* (2006.01)

(56) References Cited

U.S. PATENT DOCUMENTS

| | | | | |
|---|---|---|---|---|
| 7,263,083 | B2 * | 8/2007 | Kisigami et al. | 342/417 |
| 7,372,404 | B2 * | 5/2008 | Shirai et al. | 342/417 |
| 7,379,020 | B2 * | 5/2008 | Tsuchihashi et al. | 342/417 |
| 7,847,733 | B2 * | 12/2010 | Shirakawa | 342/417 |
| 7,898,460 | B2 * | 3/2011 | Nishimura et al. | 342/147 |
| 7,912,680 | B2 * | 3/2011 | Shirakawa | 342/444 |
| 7,928,897 | B2 * | 4/2011 | Ishii et al. | 342/147 |
| 8,203,485 | B2 * | 6/2012 | Shirakawa | 342/417 |
| 8,581,777 | B2 * | 11/2013 | Kanamoto et al. | 342/158 |
| 8,648,745 | B2 * | 2/2014 | Kanamoto | 342/158 |
| 2003/0140771 | A1 * | 7/2003 | Ohshima | 84/622 |
| 2011/0273326 | A1 * | 11/2011 | Shirakawa | 342/147 |

OTHER PUBLICATIONS

Nov. 6, 2013 European Office Action issued in European Application No. 12 162 523.0.

* cited by examiner

*FIG. 10*

DATA OF EACH TARGET

| TARGET | ANGLE | DISTANCE | SPEED |
|---|---|---|---|
| TG1 | D1 | R1 | V1 |
| TG2 | D2 | R2 | V2 |
| TG3 | D3 | R3 | V3 |
| TG4 | D4 | R4 | V4 |
| TG5 | D5 | R5 | V5 |

CASE 1

CALCULATION DEVICE FOR RADAR APPARATUS, RADAR APPARATUS, AND CALCULATION METHOD AND PROGRAM FOR RADAR APPARATUS

The disclosure of Japanese Patent Application No. 2011-082628 filed on Apr. 4, 2011, including specification, drawings and claims is incorporated herein by reference in its entirety.

BACKGROUND

The invention relates to a calculation device for a radar apparatus, a radar apparatus and calculation method and program for the radar apparatus.

Regarding algorithms for estimating an arrival direction of a radar wave received by an array antenna, DBF (Digital Beam Forming), PRISM (Propagator method based on an Improved Spatial-smoothing Matrix), MUSIC (Multiple Signal Classification), ESPRIT (Estimation of Signal Parameters via Rotational Invariance Techniques) and the like have been known (for example, refer to Patent Documents 1 to 3).

Patent Document 1: JP-A-2005-49123
Patent Document 2: JP-A-2003-14843
Patent Document 3: JP-A-2009-74990

In the high-precision algorithms using eigenvalues or eigenvectors of a correlation matrix, such as MUSIC and ESPRIT, it is necessary to preset the number of incoming waves whose angles can be separated (hereinafter, referred to as the number of separable angles or the separable-number), before estimating the arrival direction.

Here, if the received incoming wave is ideal, even though the number of separable angles is larger than the number of incoming waves, when the number of targets actually existing is one (1), as shown in FIG. 1, an angle spectrum exhibits one peak. However, in reality, as shown in FIG. 2, two or more peaks are generated for one target due to multi-paths having correlatively with a desired wave, so that an angle may be separated. Also, the method of setting the number of separable angles larger than the number of incoming waves and thus calculating an angle spectrum increases a calculation load.

Accordingly, it is preferable to set the same number of separable angles as the number of incoming waves by developing the eigenvalues of the correlation matrix by the respective reception signals before estimating the arrival direction. The number of incoming waves is obtained by using the known algorithm of estimating the number of incoming waves, such as AIC (Ahaike Information Criteria) and MDL (Minimum Descritim Length). However, the precision of the process of estimating the number of incoming waves is low and a difference of one or two occurs in many cases. Also, like an on-vehicle radar apparatus, there is a limit in hardware resources such as capability of a useable calculation circuit. Also, since a relative relation between an own-vehicle and the other vehicle is rapidly changed, it is difficult to estimate the appropriate number of incoming waves regarding specifications in which it is necessary to obtain the angle spectrum with a period of several tens of milliseconds.

SUMMARY

It is therefore an object of the present invention to provide a calculation device for a radar apparatus, a radar apparatus and calculation method and program for the radar apparatus capable of appropriately estimating an arrival direction without increasing load of calculation processing.

In order to achieve the above object, the present invention determines whether the separable-number of the estimation algorithm is proper or not, based on a magnitude of an orthogonal component calculated from a mode vector generated from an estimated angle and an input vector of each reception signal.

According to an aspect of the embodiments of the present invention, there is provided a calculation device for a radar apparatus which is configured to specify a direction of a target based on respective reception signals of a plurality of antennae, the calculation device comprising: a calculation unit configured to use a predetermined estimation algorithm of estimating angles of targets corresponding to a preset separable-number from the respective reception signals, set an arbitrary separable-number to generate a mode vector from the estimated angles of the targets, obtained by the predetermined estimation algorithm, and determine whether the set separable-number is proper or not based on a magnitude of an orthogonal component calculated from the mode vector and an input vector of the respective reception signals.

When the estimated angles, which are obtained by using the estimation algorithm in which an arbitrary value is set as the separable-number, cannot estimate the angles of all the targets, the data of the estimated result does not include data of a target whose angle has not been estimated. However, the input vector of the respective reception signals includes even the information of such target. Therefore, when the mode vector generated from the estimated angles is different from the input vector of the respective reception signals, a magnitude of the orthogonal component of both vectors is increased. Hence, the calculation device for the radar apparatus evaluates the magnitude of the orthogonal component, thereby determining whether the set separable-number is proper.

After estimating the angles, the calculation device for the radar apparatus evaluates the estimation result, thereby determining whether the separable-number is proper. Therefore, it is not necessary to perform the calculation such as AIC or MDL, which increases the calculation amount and has the low estimation accuracy, before estimating the angles. Thereby, it is possible to appropriately estimate the arrival direction without increasing the load of the calculation processing.

The calculation unit may respectively generate the mode vector corresponding to each of the set separable-number from the estimated angles of the targets, obtained by the predetermined estimation algorithm while sequentially changing the separable-number to be set, and compare magnitudes of the orthogonal components calculated for each of the set separable-number, thereby determining whether each of the set separable-number is proper or not. It is possible to obtain the proper value of the separable-number by setting the separable-number over the plurality of types and thus determining whether each of the separable-number is proper or not.

The calculation unit may determine that the set separable-number is proper when the magnitude of the orthogonal component is within a predetermined magnitude range which is determined depending on specifications that are required for the radar apparatus. When the magnitude of the orthogonal component is within the predetermined magnitude range, the mode vector, which is generated from the estimated angles of the target obtained by the estimation algorithm, is approximate to the input vector of the respective reception signals. Accordingly, it is possible to determine that the separable-number is substantially proper.

The calculation unit may output an estimated angle of the estimation algorithm, which is based on the separable-number that is determined proper by determination processing based on the magnitude of the orthogonal component. Thereby, it is possible to implement the various controls that use the appropriate estimates angles based on the proper separable-number.

In the meantime, the present invention may be implemented in forms of a method or a non-transitory program, a radar apparatus having the calculation unit or a computer-readable medium recording the non-transitory program therein.

It is possible to appropriately estimate the arrival direction without increasing the load of the calculation processing.

BRIEF DESCRIPTION OF THE DRAWINGS

In the accompanying drawings:

FIG. 10 illustrates an example of data that is transmitted to an ECU;

DETAILED DESCRIPTION OF THE EMBODIMENTS

Hereinafter, illustrative embodiments of the invention will be exemplarily described. The illustrative embodiments are just exemplary and the technical scope of the invention is not limited thereto.

Figure 1:
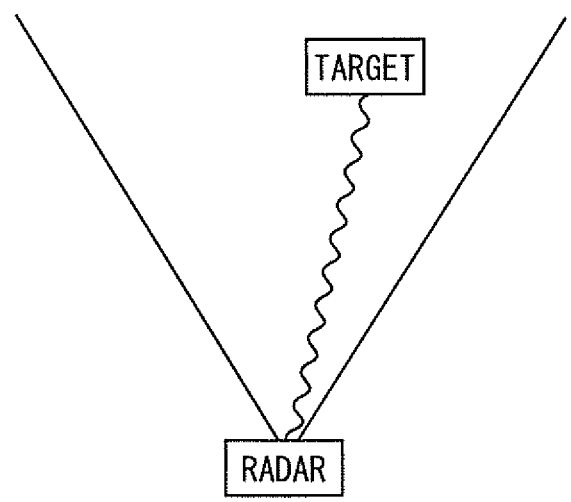
FIG. 1 illustrates a relation between a radar apparatus and a target.
Figure 2:
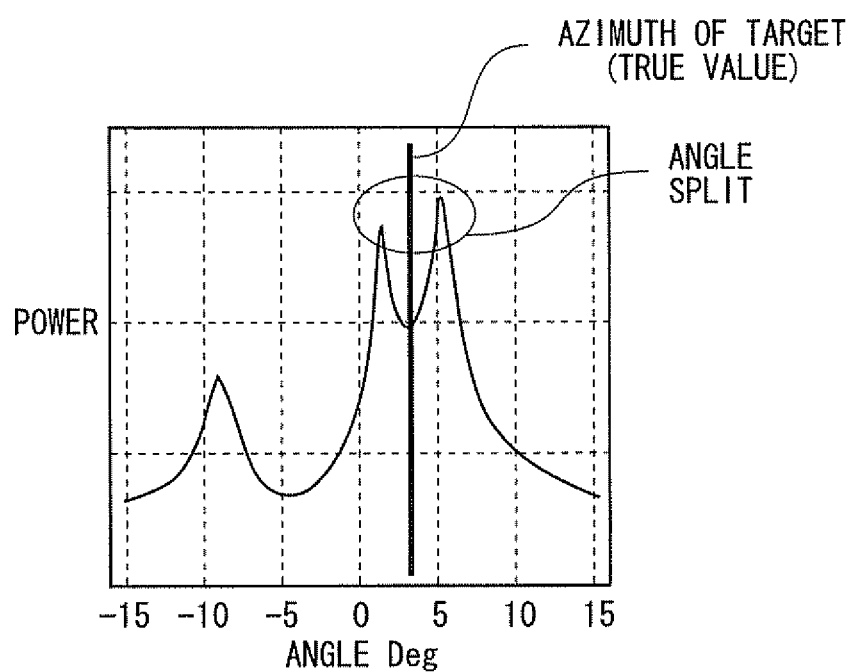
FIG. 2 illustrates an example where an angle is separated.
Figure 3:
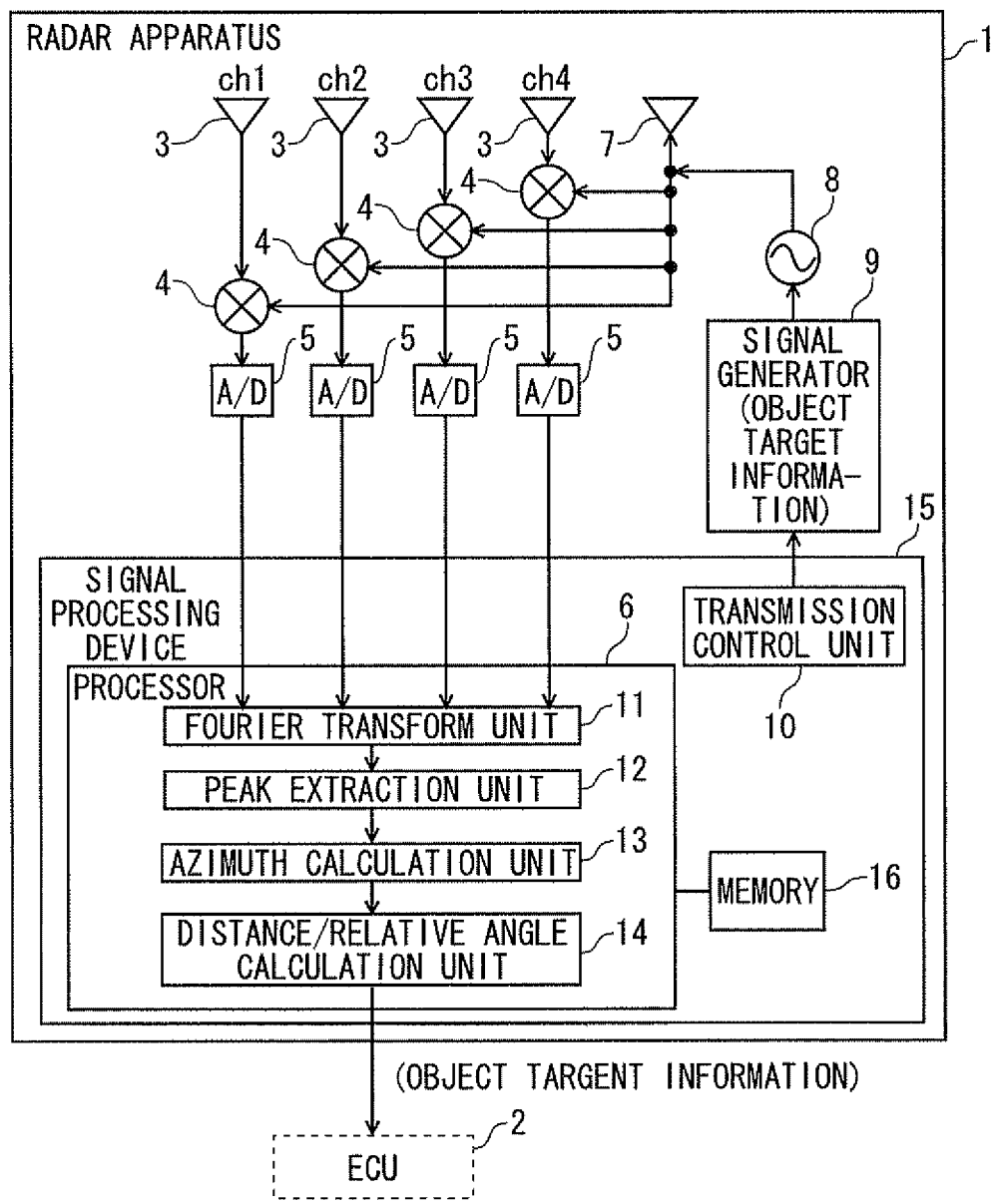
FIG. 3 illustrates a configuration of a radar apparatus.

FIG. 3 shows a configuration of a radar apparatus 1 according to an illustrative embodiment of the invention. The radar apparatus 1 is mounted on a vehicle and monitors surroundings of the vehicle by radar, thereby detecting a target such as other vehicle and obstacle. A detection result of the target is output to an ECU (Electrical Control Unit) 2 that controls the vehicle, and is thus used to control the vehicle, for example. The radar apparatus of this illustrative embodiment can be used for various utilities (for example, monitoring of an in-flight airplane, an underway ship and the like), in addition to the on-vehicle utility.

The radar apparatus 1 has receiving antennae 3 (ch1-4) that are arranged at an equal interval, mixers 4 (ch1-4) that are respectively connected to the respective receiving antennae 3, AD (Analog to Digital) converters 5 (ch1-4) that are respectively connected to the respective mixers 4 and a signal processing device 15 including a processor 6 that processes data of the respective AD converters 5. Also, the radar apparatus 1 has a transmission antenna 7, an oscillator 8, a signal generator 9 and a transmission control unit 10.

In the meantime, the radar apparatus 1 is provided with a dedicated receiving circuit for each of the receiving antennae, as described above. However, a receiving circuit that incorporates reception signals of all the receiving antennae may be provided. In this case, although it is necessary for the receiving circuit to perform control of sequentially switching the corresponding receiving antennae in a time division manner, it is possible to make the circuit configuration of the radar apparatus 1 compact.

Also, the radar apparatus 1 is independently provided with the receiving antennae and the transmission antenna. However, the receiving antenna may combine the function of the transmission antenna. In this case, each antenna is switched into a receiving state just after transmitting a radar wave and then can receive a reflected wave of the radar wave transmitted from the corresponding antenna.

In the radar apparatus 1, when power is fed from the vehicle, the processor 6 executes computer program, thereby implementing function units of a Fourier transform unit 11, a peak extraction unit 12, an azimuth calculation unit 13 and a distance/relative speed calculation unit 14. These function units are implemented as the processor 6 executes the computer program in cooperation with a memory 16. However, for convenience of explanations, in FIG. 3, the respective function units are shown in the processor 6. In the meantime, the function units are not necessarily limited to the software implementation. For example, the function units may be entirely or partially implemented by a dedicated calculation circuit that is arranged inside or outside the processor 6.

Figure 4A:
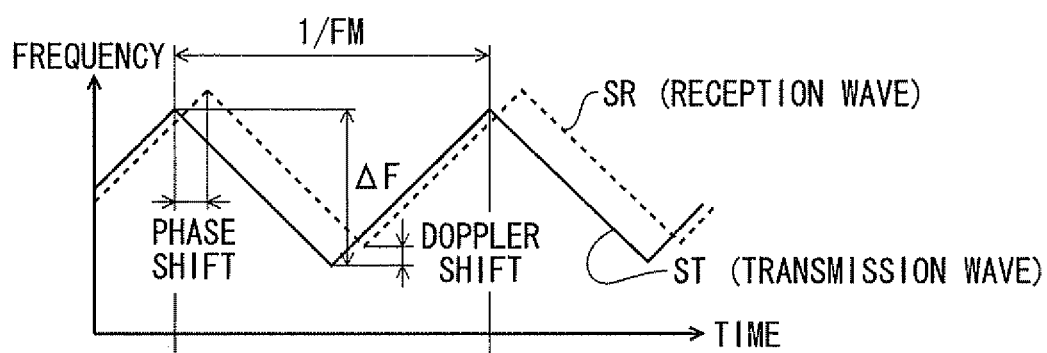
FIGS. 4A and 4B illustrate waveforms of signals that are processed in the radar apparatus.
Figure 4B:
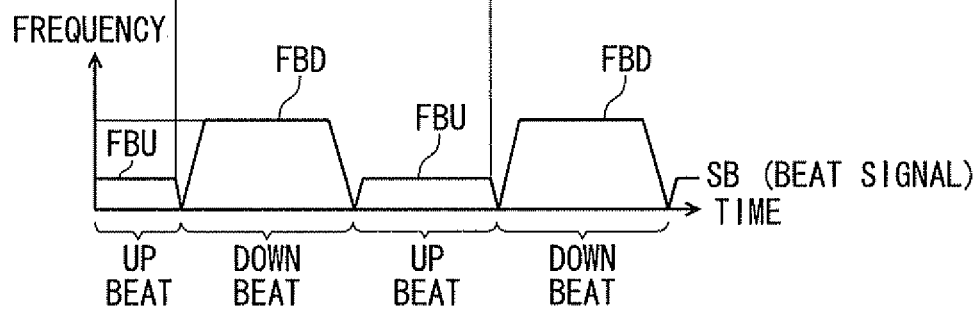

FIGS. 4A and 4B show waveforms of signals that are processed in the radar apparatus 1. The radar apparatus 1 adopts an FM-CW (Frequency Modulation-Continuous Wave) method, modulates a signal in the oscillator 8, based on a modulation signal having a voltage that changes in a triangular waveform generated in the signal generator 9, and transmits a transmission wave ST having a frequency that changes in a triangular waveform as shown in FIG. 4A. The mixer 4 (ch1-4) mixes a reception wave SR reflected from a target with the transmission wave ST, so that a beat signal SB as shown in FIG. 4B is obtained. In FIGS. 4A and 4B, a phase difference (phase shift) between the transmission wave ST and the reception wave SR is increased/decreased in proportional to a distance between the target and the radar apparatus and a frequency difference (Doppler shift) between the transmission wave ST and the reception wave SR is increased/decreased in proportional to relative speed between the target and the radar apparatus. A reference numeral FM in FIG. 4A is a frequency of the triangular wave that is generated by the signal generator 9. In the meantime, when there is a plurality of targets having different relative speeds or distances, a plurality of reflected waves having different phase shift amounts or Doppler shift amounts is received by the respective antennae and the beat signals SB obtained from the respective mixers 4 (ch1-4) include various components corresponding to the targets. However, FIGS. 4A and 4B exemplify the waveform when one target exists, for the purpose of easy understanding.

Figure 5:
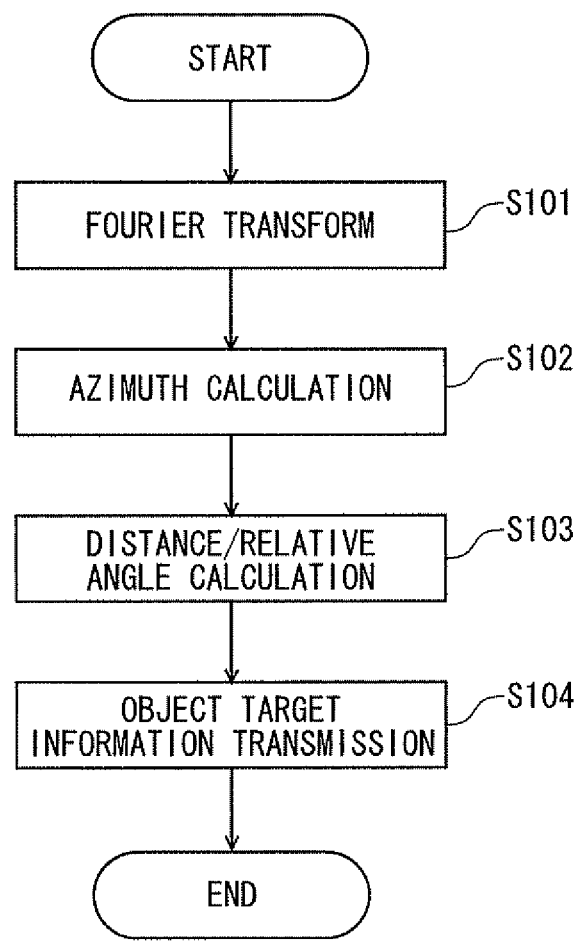
FIG. 5 is a flowchart illustrating main processing.

In the below, a processing flow that is executed by the processor 6 when the power is fed to the radar apparatus 1 from the vehicle is described with reference to a flowchart of FIG. 5. When a driving source of the vehicle operates, i.e., an engine starts (when the driving source is an internal combustion engine), or a system power supply turns on (when the driving source is a hybrid system or EV (Electric Car) system), the processor 6 repeats the processing flow described in the below.

Figure 6:
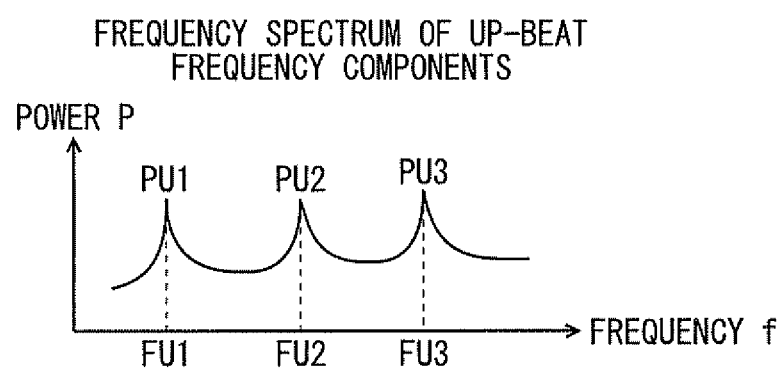
FIG. 6 illustrates a frequency spectrum of up-beat frequency components.
Figure 7:
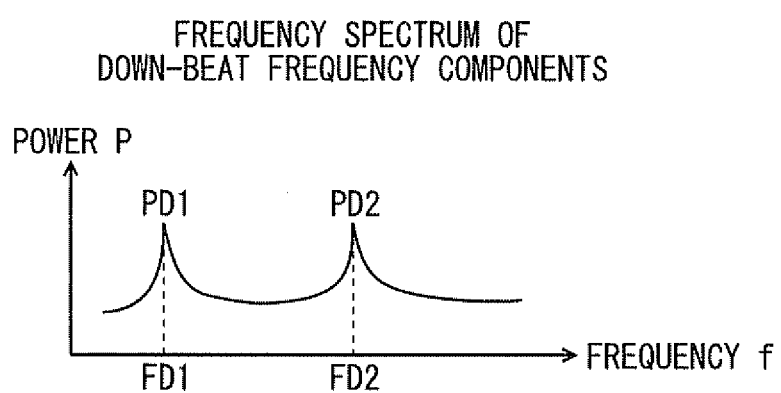
FIG. 7 illustrates a frequency spectrum of down-beat frequency components.

(step S101) The processor 6 performs a Fourier transform for each of up-beat frequency components FBU and down-beat frequency components FBD of the beat signal SB for each channel (ch1-4), thereby obtaining a frequency spectrum of the up-beat frequency components FBU as shown in FIG. 6 and a frequency spectrum of the down-beat frequency components FBD as shown in FIG. 7.

Since the respective receiving antennae 3 (ch1-4) receive the reflected waves from the same target, the frequency spectra of the same shape having the same peak frequencies are obtained from the respective receiving antennae 3 (ch1-4) in the Fourier transform. However, since phases are different in the respective receiving antennae 3 (ch1-4), the phases are different for each antenna even though the peak frequencies are the same. For example, a peak PU1 (ch1) of the frequency spectrum of the receiving antenna 3 (ch1) and a peak PU1 (ch2) of the frequency spectrum of the receiving antenna 3 (ch2) are the same with respect to the frequency but are different with respect to the phase.

The processor 6 extracts peaks having predetermined power or higher from the respective frequency spectra of the up-beat frequency components FBU and the down-beat frequency components FBD obtained by the Fourier transform, and extracts frequencies, powers and phases of the extracted peaks.

Figure 8:
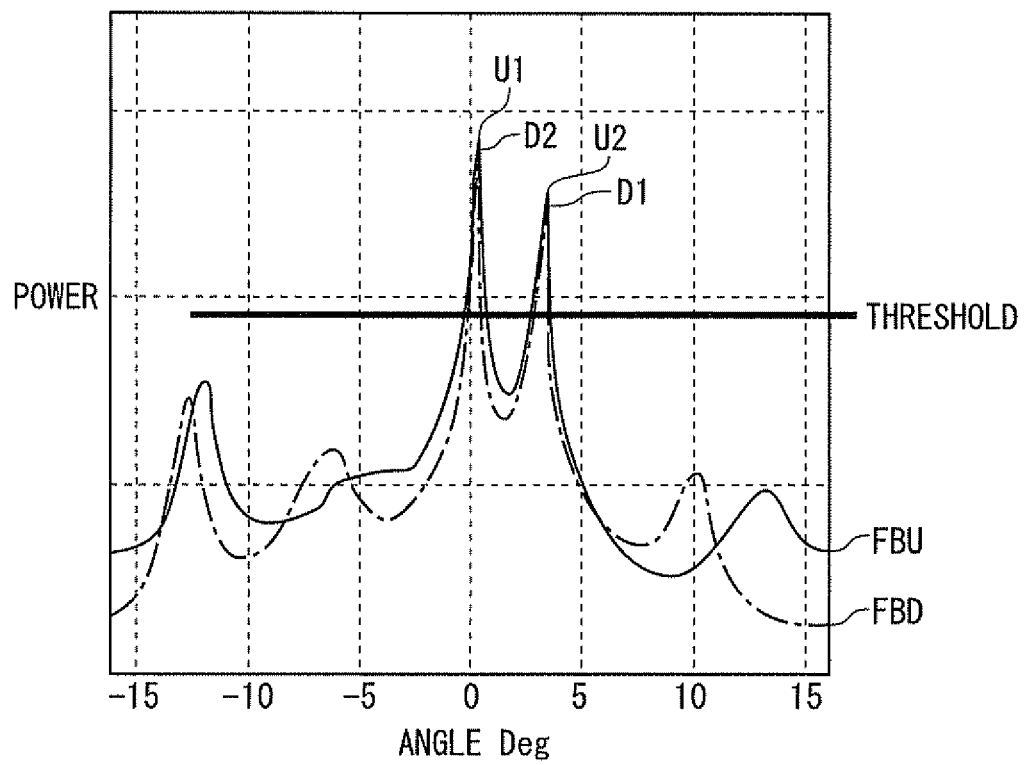
FIG. 8 illustrates angle spectra.

(step S102) Since the peaks of the frequency spectrum may include information of a plurality of targets, it is necessary to separate a target from one peak and to estimate an angle of the separated target. Accordingly, the processor 6 calculates angle spectra as shown in FIG. 8 for each of the up-beat frequency component FBU and down-beat frequency component FBD, based on the peaks having the same frequency in all the receiving antennae 3 (ch1-4) (for example, for the up-beat frequency component FBU, the peak PU1 (ch1), the peak PU1 (ch2), the peak PU1 (ch3) and the peak PU1 (ch4) are peaks having the same frequency FU1, and for the down-beat frequency component FBD, the peak PD1 (ch1), the peak PD1 (ch2), the peak PD1 (ch3) and the peak PD1 (ch4) are peaks having the same frequency FD1).

Regarding the method of calculating the angle spectrum, various methods such as CAPON and DBF methods have been suggested. In this illustrative embodiment, the processor 6 of the radar apparatus 1 obtains the angle spectrum, based on a predetermined angle estimation method (for example, MUSIC, ESPRIT or maximum likelihood method) in which it is necessary to preset the number of incoming waves as the number of separable angles by using the AIC or MDL, which is the algorithm of estimating the number of incoming waves.). For example, in case of the ESPRIT, a correlation matrix is formed from reception signals and an arrival direction of the reflected waves is estimated based on properties of eigenvalues and eigenvectors, on the presumption that a wave source of reflected waves is a point wave source having no spreading and the reflected waves are planar waves that are incident onto all the receiving antennae in parallel with each other. Accordingly, the information of the number of incoming waves is necessary when treating the correlation matrix and eigenvalues.

Figure 9:
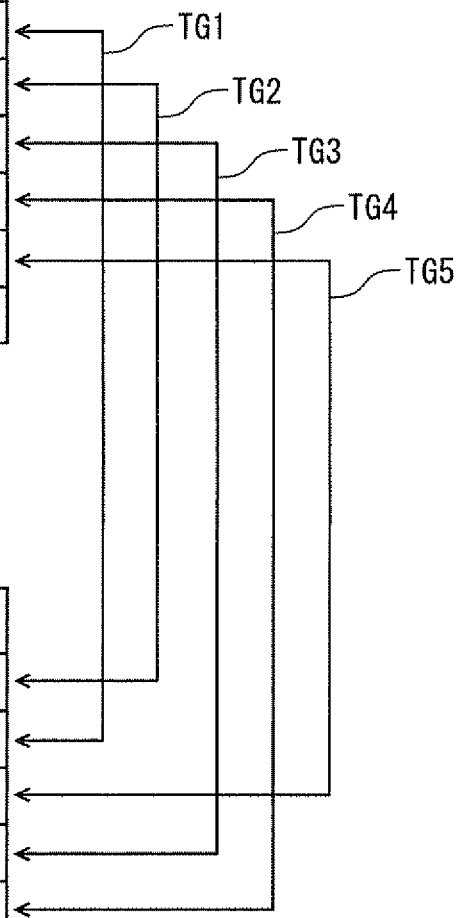
FIG. 9 illustrates examples of angles and powers of respective peaks.

The processor 6 calculates an angle spectrum by the predetermined angle estimation method, for each of peak frequencies of the frequency spectrum. For example, regarding the frequency spectra shown in FIGS. 6 and 7, the processor 6 calculates an angle spectrum for each of the five peak frequencies (FU1-3, FD1-2). FIG. 8 is an example of the angle spectrum of the peak frequency FU1 of the up-beat frequency component FBU, in which an angle spectrum of the peak frequency (for example, FD1) of the down-beat frequency component FBD obtained from the same target is also shown together. Then, the processor extracts angles and powers of the peaks of the angle spectrum, for each of the angle spectra of the five peak frequencies (FU1-3, FD1-2). FIG. 9 shows an example of the angles and powers of the respective peaks of the respective angle spectra of the five peak frequencies (FU1-3, FD1-2).

(step S103) When the processor 6 extracts the angles and powers of the respective peaks of the respective angle spectra, the processor pairs the respective peaks, thereby specifying a target that actually exists. That is, the processor 6 pairs the respective peaks of the angle spectrum of the up-beat frequency component FBU and the respective peaks of the angle spectrum of the down-beat frequency component FBU, which peaks are similar to each other with respect to the angles or powers. For example, in the angle spectra shown in FIG. 8, the angles and powers of the peak U1 and peak U2 of the peak frequency FU1 of the up-beat frequency component FBU are respectively approximate to the angles and powers of the peak D2 and peak D1 of the peak frequency FD1 of the down-beat frequency component FBD. For example, the peak U1 and the peak D2 are similar to each other, in that the angles thereof are about 0°, and the peak U2 and the peak D1 are similar to each other, in that the angles thereof are about 3°. Accordingly, since the angle θU1 and power PWU1 of the peak U1 and the angle θD2 and power PWD2 of the peak D2, which are shown in FIG. 9, are similar to each other and the peak U1 and the peak D2 are thus paired, it is specified that the peak U1 and the peak D2 indicate the target TG1.

The processor 6 pairs the respective peaks (peaks U1-6) of the angle spectrum of the up-beat frequency component FBU and the respective peaks (peaks D1-5) of the angle spectrum of the down-beat frequency component FBD, thereby specifying five targets TG1-5, as shown in FIG. 9. In the meantime, the peak U6 of the angle spectrum of the up-beat frequency component FBU is not paired with any peak of the angle spectrum of the down-beat frequency component FBD. Therefore, it can be seen that the peak U6 is a peak that is caused due to internal noises and the like and is not caused from a target that actually exists.

The processor 6 calculates angles, distances and relative speeds of the respective targets, based on the paired peak frequencies. Here, when propagation speed of the radar wave is C, a modulation frequency of the triangular wave generated from the signal generator 9 is FBU a central frequency of the triangular wave is F0 and a modulation width of the triangular wave is ΔF, a distance R (R1 to R5) and relative speed V (V1 to V5) of each target are deduced by following equations.

$$R = ((FU+FD) \cdot C)/(8 \cdot \Delta F \cdot FM)$$

$$V = ((FD+FD) \cdot C)/(4 \cdot F0)$$

Also, although the angles of the peaks of the up-beat frequency component FBU and down-beat frequency component FBD, which are paired, are the substantially same, an angle D (D1 to D5) of each target is deduced by a following equation so as to further increase the accuracy.

$$D = (\theta U + \theta D)/2$$

(step S104) The processor 6 outputs data of the angles, distances and relative speeds of the respective targets to the ECU 2. For example, when the five targets are specified from the respective peaks of the angle spectra, as shown in FIG. 9, the data as shown in FIG. 10 is transmitted from the processor 6 to the ECU 2. The data of the angles, distances and relative speeds of the respective targets is used in the ECU 2 to control the vehicle, for example.

Here, when obtaining the angle spectrum in the azimuth calculation (step S102), the processor 6 executes following processing. The following processing is to obtain an appropriate angle spectrum. In the processing, based on angle estimation results calculated while changing the number of separable angles, a magnitude of an orthogonal component, i.e., a magnitude of a norm (a length of a complex vector) of a coefficient of a mode vector basis, which is obtained by converting a basis of an input vector of each antenna when an incoming wave incomes from an estimated angle, is evaluated to specify the proper number of separable angles.

Figure 11:
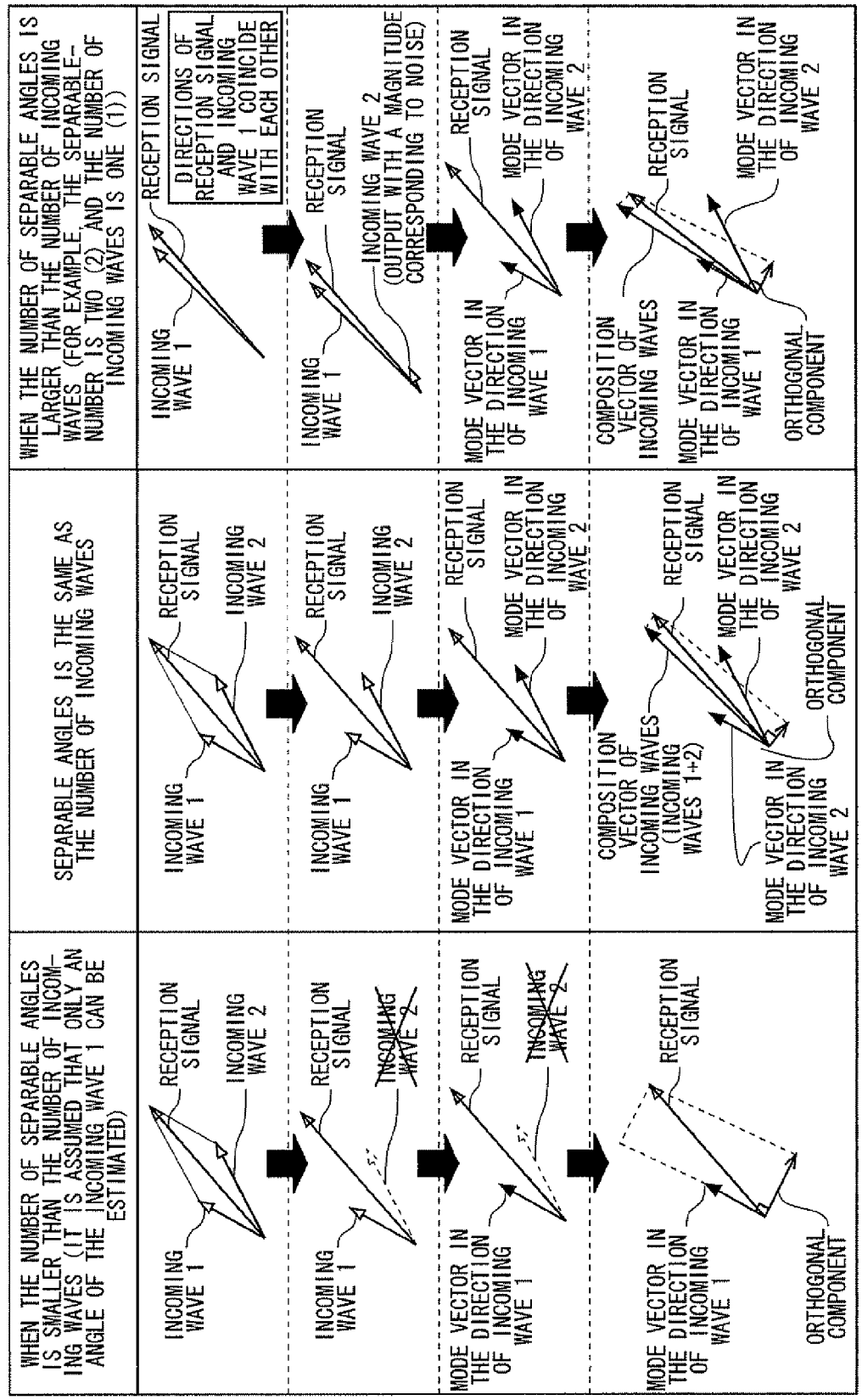
FIG. 11 is a conceptual view illustrating processing of correcting the number of separable angles.

FIG. 11 is a conceptual view showing the following processing. Since a four-dimensional or more space cannot be shown in the drawings, the space is shown three-dimensionally for descriptive purposes in FIG. 11 while tentatively assuming that the number of channels of the receiving antennae is two (2). First, a case is considered in which the number of separable angles is smaller than the number of incoming waves (refer to the left column in FIG. 11).

When there are an incoming wave 1 and an incoming wave 2, an input vector of each antenna is a composition vector of the two incoming waves. It is assumed that both the incoming waves 1 and 2 are clearly greater than the noise. Here, when the arrival direction is estimated with the number of separable angles smaller than the number of incoming waves, only an angle of any one incoming wave is estimated and an angle of the other incoming wave cannot be estimated. The example of the left column of FIG. 11 shows that only an angle of the incoming wave 1 is calculated and an angle of the incoming wave 2 is not calculated. In this case, since the mode vector is created only with the angle of the incoming wave 1, an angle between the mode vector and the input vector is increased, so that a magnitude of an orthogonal component is increased.

In the meantime, when the arrival direction is estimated with the same number of separable angles as the number of incoming waves, both angles of the incoming wave 1 and 2 are respectively estimated. An example of the central column of FIG. 11 shows that both angles of the incoming waves 1 and 2 are calculated. In this case, since the mode vector is created with the angles of the incoming waves 1 and 2, a direction of a composition mode vector of the incoming waves 1 and 2 substantially coincides with the direction of the input vector. Therefore, since an angle between the composition mode vector and the input vector is small, a magnitude of an orthogonal component of the composition mode vector is decreased.

Also, when the number of separable angles is larger than the number of incoming waves, a case where the number of mode vectors is the same as the number of incoming waves and a case where one mode vector is split occur. Also in the cases, as shown in the right column of FIG. 11, a magnitude of an orthogonal component is decreased in any case.

Figure 12:
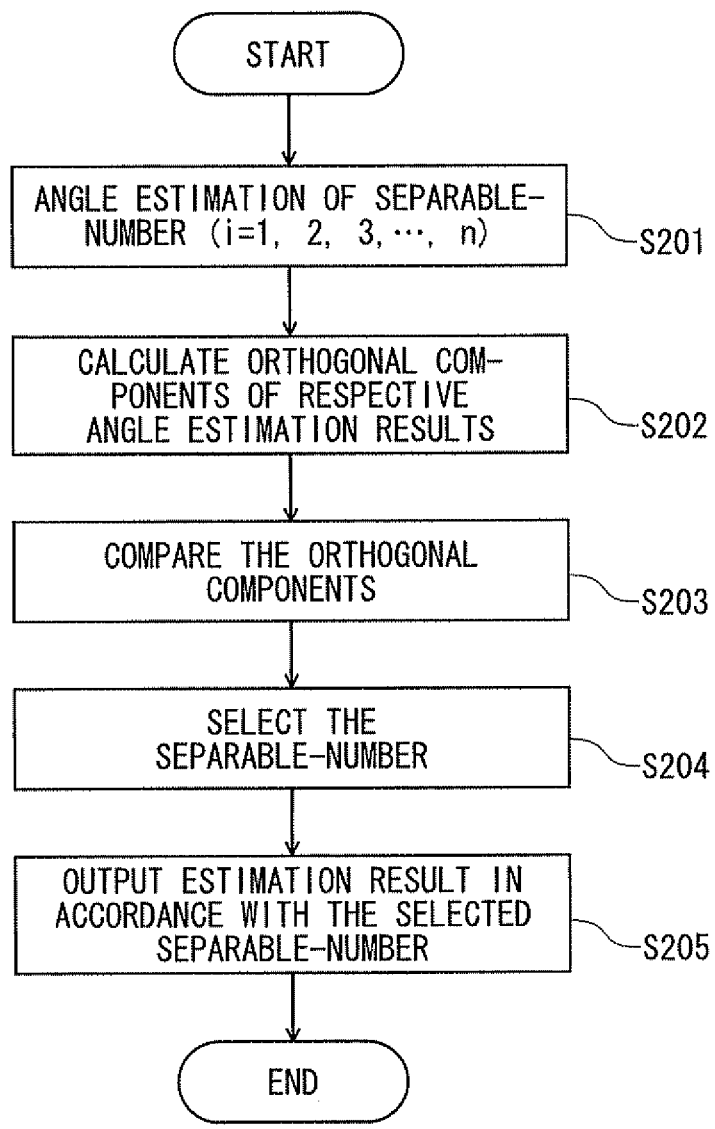
FIG. 12 is a flowchart illustrating main processing.

A following processing flow is based on the above concepts described with reference to FIG. 11 and is executed when the processor 6 obtains an angle spectrum. In the below, the processing is described with reference to a flowchart shown in FIG. 12.

(step S201) The processor 6 calculates n angle estimation results, based on the predetermined angle estimation method, while sequentially changing the number of separable angles from 1 to n, and stores the calculated results in the memory 16. The number of times of angle estimations (the number of snapshots) is arbitrary. The number of separable angles can be changed by changing the number of receiving antennae (the number of receiving antennae configuring one sub-array) averaged in spatial averaging processing.

(step S202) The processor 6 calculates the orthogonal components, respectively, for each of the calculated n angle estimation results. For example, when the number of separable angles is three (3), three arrival direction angles are calculated as the angle estimation results. Thus, the angles are indicated with θ1, θ2 and θ3. In this case, each mode vector of the respective angles θ1 to θ3 can be symbolized as follows.

$$a(\theta 1)=(a11\,a12\,a13\,a14)$$

$$a(\theta 2)=(a21\,a22\,a23\,a24)$$

$$a(\theta 3)=(a31\,a32\,a33\,a34) \qquad \text{[equation 1]}$$

Here, each mode vector is expressed by a matrix, as follows.

$$A = \begin{bmatrix} a11 & a21 & a31 \\ a12 & a22 & a32 \\ a13 & a23 & a33 \\ a14 & a24 & a34 \end{bmatrix} \qquad \text{[equation 2]}$$

Figure 13:
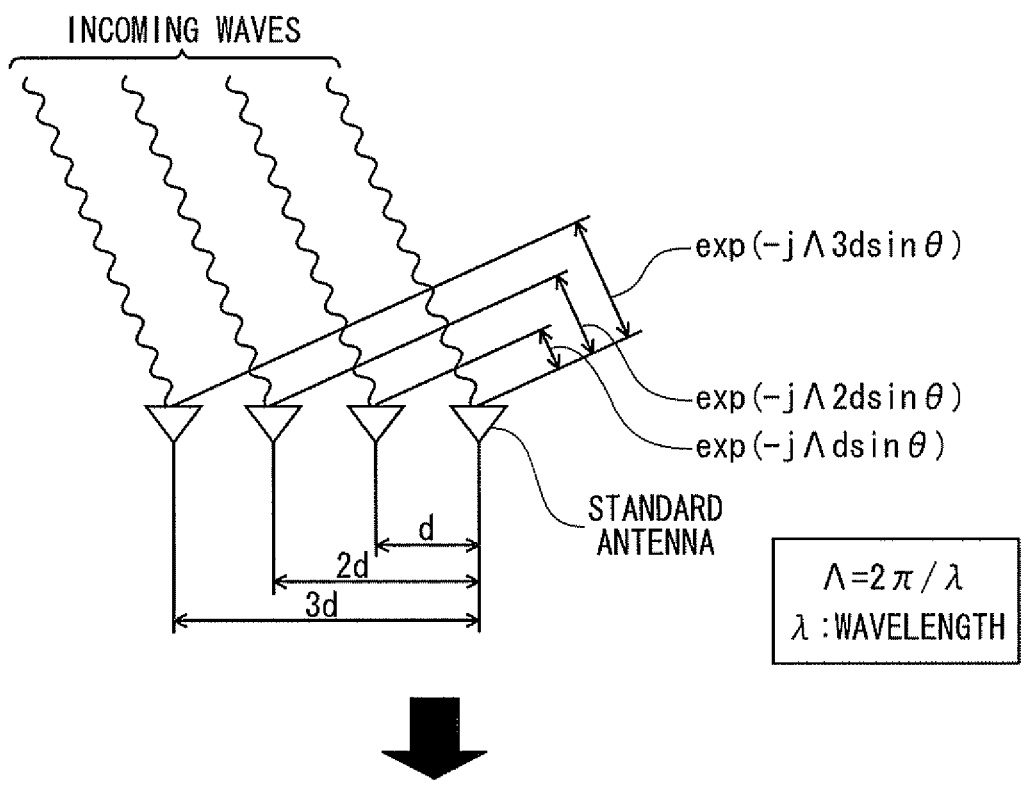
FIG. 13 illustrates a mode vector.

In the meantime, the mode vector $a(\theta)$ is a vector of arranging and expressing ideal reception signals when incoming waves having an amplitude 1 arrive at the respective receiving antennae 3 (ch1-4) from a θ direction, in a complex form. For example, the mode vector is expressed with a complex vector as shown in FIG. 13.

Then, the processor obtains a vector P, which is orthogonal to the three mode vectors corresponding to the respective angles θ1 to θ3, by a following calculation of using a propagator method capable of performing a relative high-speed calculation, without eigenvalue decomposition.

A matrix, which is obtained by extracting first to third rows of the direction matrix A, is referred to as A1 and a matrix, which is obtained by extracting the fourth row of the direction matrix A, is referred to as A2.

$$A1 = \begin{bmatrix} a11 & a21 & a31 \\ a12 & a22 & a32 \\ a13 & a23 & a33 \end{bmatrix} \qquad \text{[equation 3]}$$

$$A2 = [\,a14 \quad a24 \quad a34\,]$$

Since the matrix A1 is obtained by extracting first to third rows of the direction matrix A, it indicates a direction matrix of the reception signals of the sub-array configured by the three receiving antennae 3 (ch1-3). Also, since the matrix A2 is obtained by extracting the fourth row of the direction matrix A, it indicates a direction matrix of the reception signal of the receiving antenna 3 (ch4). Here, the vector P orthogonal to the three mode vectors is expressed by a following equation. In the meantime, t indicates transposition and H indicates complex conjugate transposition.

$$P = \begin{bmatrix} (A2 * A1^{-1})^H \\ -1 \end{bmatrix} \qquad \text{[equation 4]}$$

$$= [\,p1 \quad p2 \quad p3 \quad p4\,]^t$$

In order to correctly calculate the magnitude of the orthogonal component, a magnitude of the vector P is adjusted to be same as that of the mode vector in a following equation.

$$\sqrt{\text{the number of channels}} \; \frac{P}{|P|} \qquad [\text{equation 5}]$$

A matrix having the orthogonal components added to the mode vectors is defined as follows.

$$B = \begin{bmatrix} a11 & a21 & a31 & p1 \\ a12 & a22 & a32 & p2 \\ a13 & a23 & a33 & p3 \\ a14 & a24 & a34 & p4 \end{bmatrix} \qquad [\text{equation 6}]$$

Also, the reception signals of the respective receiving antennae 3 (ch1-4) are defined as Y1 to Y4 and the input vector Y of the reception signals is defined as follows.

$$Y = \begin{bmatrix} Y1 \\ Y2 \\ Y3 \\ Y4 \end{bmatrix} \qquad [\text{equation 7}]$$

Then, when the basis of the input vector Y is converted from a standard basis to a mode vector basis by a following equation, it is possible to obtain respective coefficients of the bases of the mode vector and orthogonal component. In the meantime, since it has only to calculate the coefficient of the basis of the orthogonal component, following calculations of bn1-3 may be omitted.

$$B^{-1} * Y = \begin{bmatrix} bn1(= \text{coefficient of } \theta1 \text{ azimuth}) \\ bn2(= \text{coefficient of } \theta2 \text{ azimuth}) \\ bn3(= \text{coefficient of } \theta3 \text{ azimuth}) \\ bn4(= \text{coefficient of orthogonal component}) \end{bmatrix} \qquad [\text{equation 8}]$$

The length (norm) of the complex vector bn4 obtained in the above becomes a magnitude of the orthogonal component.

(step S203) When the magnitudes of the orthogonal components of the respective angle estimation results of the number of separable angles from 1 to n are calculated, the processor 6 compares the magnitudes. When the number of separable angles is smaller than the number of incoming waves, the magnitude of the orthogonal component based on the vector, which is obtained by substituting the estimated angles for the mode vector, and the vector of the actual reception signals is increased. On the other hand, when the number of separable angles is larger than the number of incoming waves, the magnitude of the orthogonal component based on the vector, which is obtained by substituting the estimated angles for the mode vector, and the vector of the actual reception signals is decreased. As a result, the magnitudes of the orthogonal components of the respective angle estimation results of the number of separable angles from 1 to n are as follows, for example.

Figure 14:
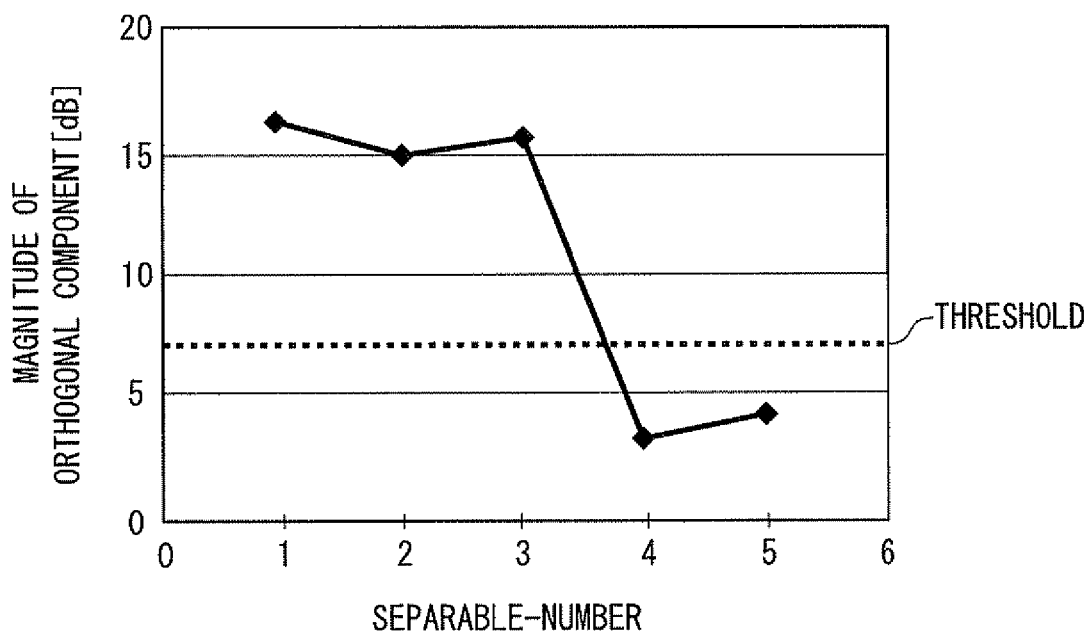
FIG. 14 is a graph exemplifying magnitudes of orthogonal components.

FIG. 14 is a graph exemplifying magnitudes of the orthogonal components of the respective angle estimation results. In the example shown in FIG. 14, when the number of separable angles is 1 to 3, the magnitudes of the orthogonal component are larger than a threshold, and when the number of separable angles is 4 and 5, the magnitudes of the orthogonal component are smaller than the threshold. In the meantime, the threshold is appropriately determined depending on the specifications that are required for the radar apparatus 1. When the incoming wave is ideal, it is preferable to set the threshold to be marginal a little from a magnitude of the noise included in the reception signal. However, in actual apparatuses, since there are errors in the respective apparatuses, the value of the threshold is appropriately adapted.

(step S204) The processor 6 selects the appropriate number of separable angles from the comparison result of the orthogonal components. The appropriate number of separable angles is a value that is the number of incoming waves or larger and at which the calculation load is lowest. Specifically, the appropriate number of separable angles is the smallest value of the number of separable angles at which the magnitude of the orthogonal component is the threshold or below. For example, for the example shown in FIG. 14, the appropriate number of separable angles is four (4).

(step S205) The processor 6 outputs an angle estimation result based on the selected number of separable angles to the ECU 2.

The radar apparatus 1 of this illustrative embodiment obtains the optimal number of separable angles, based on the magnitude of the orthogonal component, when obtaining the angle spectrum. Therefore, it is possible to appropriately estimate the arrival direction without increasing the load of the calculation processing. Hence, it is possible to appropriately estimate the arrival direction even when there is a limit in the capability of the useable calculation circuit and it is necessary to obtain the angle spectrum with a period of several tens of milliseconds due to the rapid change in the relative relation between the own-vehicle and the other vehicle, which requirements are imposed when the radar apparatus is mounted on the vehicle. Meanwhile, in step S201, the number of separable angles is sequentially changed from 1 to n. However, the orthogonal components may be compared whenever the number of separable angles is increased or decreased.

In order to verify the effects of the radar apparatus 1, tests were made for two cases. In the below, test results are described while comparing the same with the conventional examples.

Figure 15:
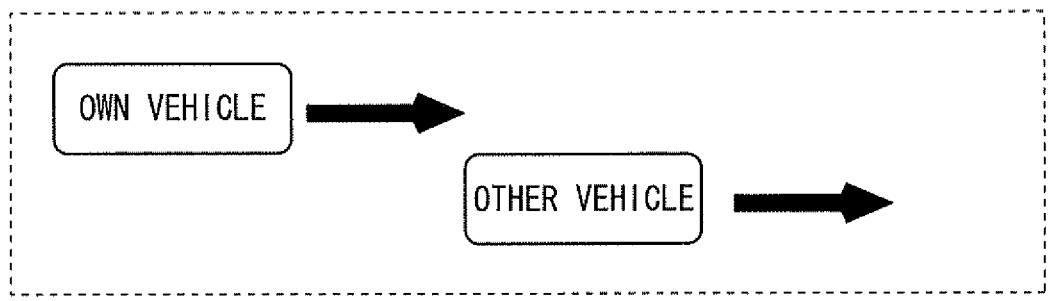
FIG. 15 illustrates an outline of a first test.
Figure 16:
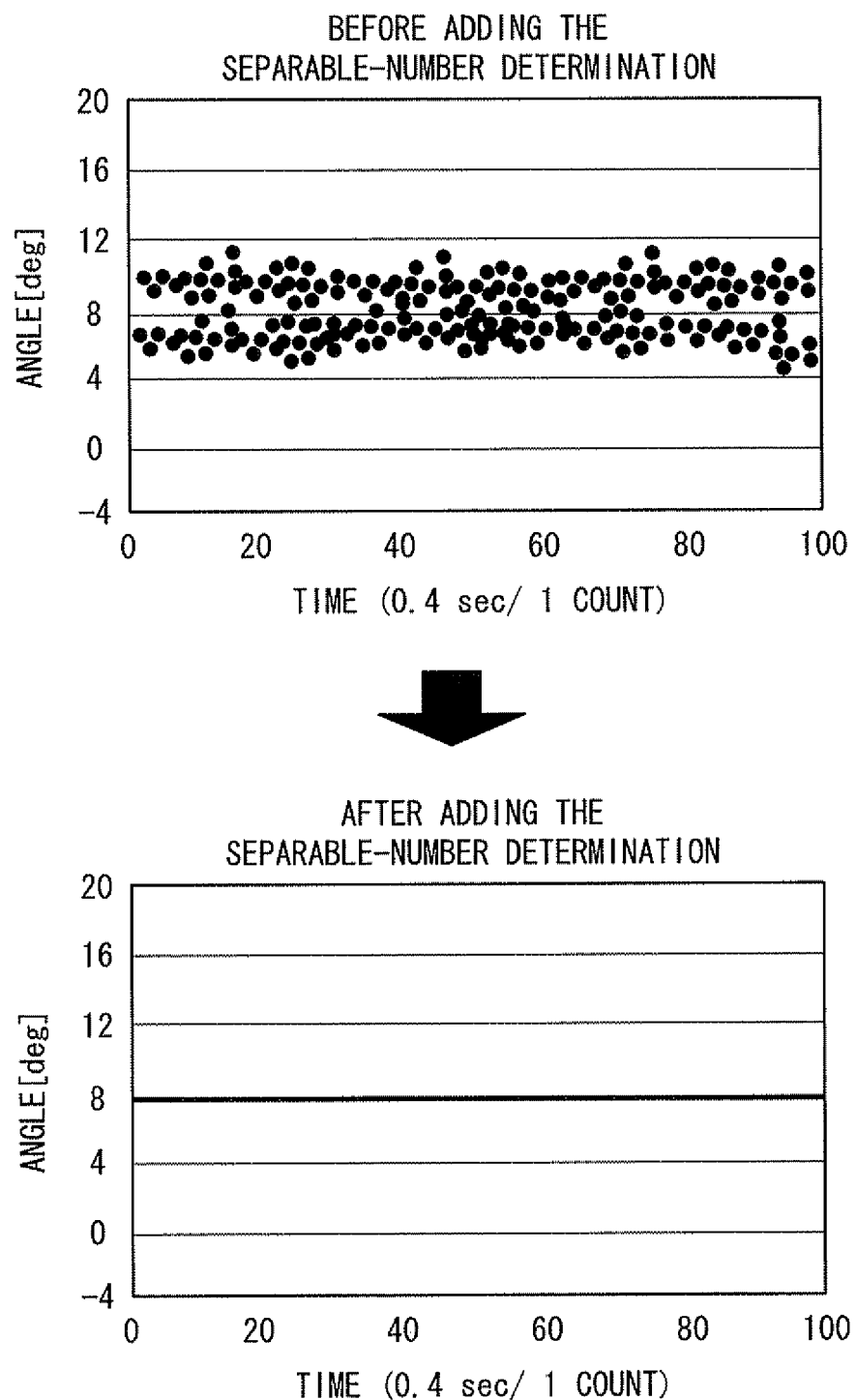
FIG. 16 illustrates a first test result.

As shown in FIG. 15, a first test was performed for a case where the own vehicle and the preceding vehicle travel at the same speed in the same direction. A result of the first test is shown in FIG. 16. In this case, since the own vehicle and the other vehicle travel at the same speed in the same direction, the relative positional relation of both vehicles is constant and data of a constant angle is theoretically output from the radar apparatus 1. However, as shown in the test data of FIG. 16, in the conventional example in which the separable-number is not determined, since the number of separable angles of two or more is set for one target (the other vehicle), the azimuth of the other vehicle may not be determined due to the multi-paths and the like. On the other hand, since the processing of determining the number of separable angles is performed in the radar apparatus 1, the data of the number of separable angles of one is selected for the one target (the other vehicle) and the data of a constant angle is output from the radar apparatus 1.

Figure 17:
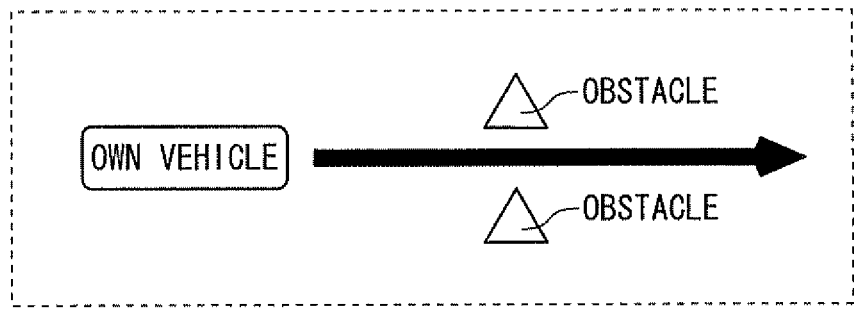
FIG. 17 illustrates an outline of a second test.
Figure 18:
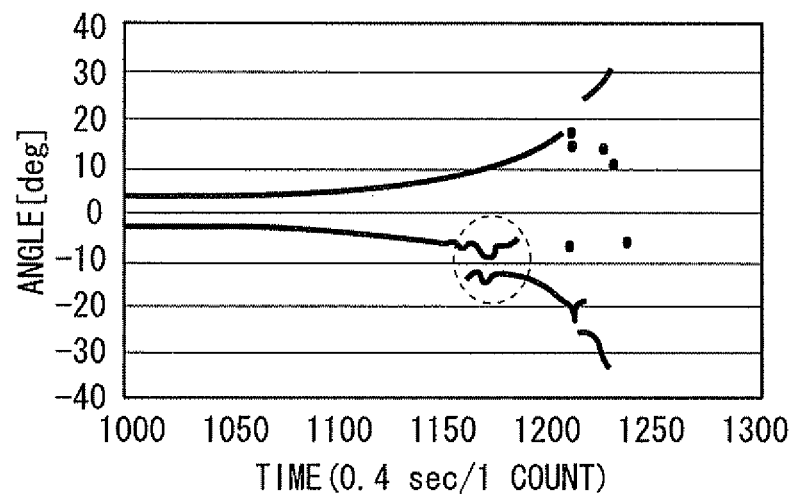
FIG. 18 illustrates a second test result.
Figure 18:
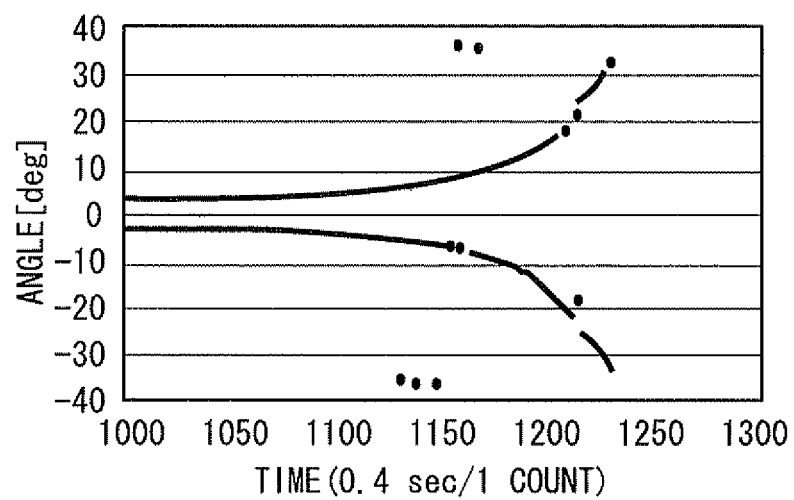

Also, as shown in FIG. 17, a second test was performed for a case where the own vehicle passes between two obstacles. A result of the second test is shown in FIG. 17. In this case, since the own vehicle passes between two obstacles, data that azimuths of two obstacles are gradually enlarged as the own vehicle advances is theoretically output from the radar apparatus 1. However, as shown in the test data of FIG. 18, in the conventional example in which the separable-number is not determined, since the number of separable angles of three or more is set for the two targets (obstacles), three or more targets may be output as the obstacles, due to the multi-paths and the like (for example, refer to the broken line of the graph in FIG. 18). On the other hand, since the processing of determining the number of separable angles is performed in the radar apparatus 1, the data of the number of separable angles of two is selected for the two targets (obstacles) and the data of two obstacles is properly output from the radar apparatus 1.

What is claimed is:

1. A calculation device for use with a radar apparatus, the calculation device being configured to specify a direction of a target based on respective reception signals of a plurality of antennae, the calculation device comprising:

a calculation unit configured to: (1) estimate angles of targets corresponding to a preset number of separation angles from the respective reception signals based on a predetermined estimation algorithm, (2) set an arbitrary number of separation angles to generate a mode vector from the estimated angles of the targets, obtained by the predetermined estimation algorithm, and (3) determine whether the set number of separation angles is a minimum value of the number of separable angles based on a magnitude of an orthogonal component calculated from the mode vector and an input vector of the respective reception signals.

2. The calculation device according to claim 1, wherein the calculation unit respectively generates the mode vector corresponding to each of the set number of separation angles from the estimated angles of the targets, obtained by the predetermined estimation algorithm while sequentially changing the number of separation angles to be set, and compares magnitudes of the orthogonal component calculated for each of the set number of separation angles, thereby determining whether each of the set number of separation angles is a minimum value of the number of separable angles.

3. The calculation device according to claim 1, wherein the calculation unit determines that the set number of separation angles is a minimum value of the number of separable angles when the magnitude of the orthogonal component is within a predetermined magnitude range which is determined depending on specifications that are required for the radar apparatus.

4. The calculation device according to claim 1, wherein the calculation unit outputs an estimated angle of the estimation algorithm, which is based on the number of separation angles that is determined as being a minimum value of the number of separable angles based on the magnitude of the orthogonal component.

5. A radar apparatus which is configured to specify a direction of a target, comprising:

a plurality of antennae, and a calculation unit configured to: (1) estimate angles of targets corresponding to a preset number of separation angles from respective reception signals of the antennae based on a predetermined estimation algorithm, (2) set a predetermined number of separation angles to generate a mode vector from the estimated angles of the targets, obtained by the predetermined estimation algorithm, and (3) determine whether the set number of separation angles is a minimum value of the number of separable angles based on a magnitude of an orthogonal component calculated from the mode vector and an input vector of the respective reception signals.

6. A calculation method for use with a radar apparatus, the calculation method specifying a direction of a target based on reception signals from a plurality of antennae of the radar apparatus, the calculation method comprising:

receiving reception signals transmitted from the plurality of antennae;

estimating angles of targets corresponding to a preset number of separation angles from the received reception signals using a predetermined estimation algorithm;

setting a predetermined number of separation angles to generate a mode vector from the estimated angles of the targets that is obtained by the predetermined estimation algorithm, and determining whether the set number of separation angles is a minimum value of the number of separable angles based on a magnitude of an orthogonal component calculated from the mode vector and an input vector of the respective reception signals.

7. A non-transitory computer-readable medium storing a calculation program for a radar apparatus, the calculation program being configured to specify a direction of a target based on respective reception signals of a plurality of antennae, the calculation program causing the radar apparatus to execute a calculation method comprising:

estimating angles of targets corresponding to a preset number of separation angles from the respective reception signals using a predetermined estimation algorithm;

setting a predetermined number of separation angles to generate a mode vector from the estimated angles of the targets, obtained by the predetermined estimation algorithm, and determining whether the set number of separation angles is a minimum value of the number of separable angles based on a magnitude of an orthogonal component calculated from the mode vector and an input vector of the respective reception signals.

* * * * *